United States Patent [19]
Katamachi et al.

[11] Patent Number: 5,893,308
[45] Date of Patent: Apr. 13, 1999

[54] METHOD OF POSITIONING WORK PIECE AND SYSTEM THEREFOR

[75] Inventors: Shozo Katamachi; Shinji Shibaoka, both of Mitaka, Japan

[73] Assignee: Tokyo Seimitsu Co., Ltd., Tokyo, Japan

[21] Appl. No.: 08/852,605

[22] Filed: May 7, 1997

Related U.S. Application Data

[63] Continuation of application No. 08/438,271, May 10, 1995, abandoned.

[30] Foreign Application Priority Data

May 19, 1994 [JP] Japan ................................ 6-105486
Jul. 18, 1994 [JP] Japan ................................ 6-165342

[51] Int. Cl.$^6$ ............................................. B26D 1/50
[52] U.S. Cl. ......................... 83/13; 83/421; 83/651.1; 125/21
[58] Field of Search ................. 125/21, 35; 83/651.1, 83/63, 370, 418, 421, 13

[56] References Cited

U.S. PATENT DOCUMENTS

| | | | |
|---|---|---|---|
| 3,838,678 | 10/1974 | Kumada et al. | 125/13.02 |
| 3,855,738 | 12/1974 | Guggenheim, Sr. et al. | 125/13.01 |
| 4,084,354 | 4/1978 | Grandia et al. | 451/41 |
| 4,498,451 | 2/1985 | Beltz et al. | 125/23.01 |
| 5,052,366 | 10/1991 | Matsukura | 83/651.1 |
| 5,529,051 | 6/1996 | Miller | 125/12 |
| 5,685,210 | 11/1997 | Ringle et al. | 83/63 |

FOREIGN PATENT DOCUMENTS 3-10760  1/1991  Japan.

*Primary Examiner*—Kenneth E. Peterson
*Attorney, Agent, or Firm*—Oliff & Berridge, PLC

[57] ABSTRACT

A work piece such as a semiconductor ingot is positioned and bonded to a work piece bonding block by means of a bonding jig which is provided separately from a wire saw in such a manner that the central axis of the work piece and respective horizontal and vertical surfaces of the work piece bonding block come into parallel to each other. Then, the work piece bonding block is positioned and mounted at a mounting jig which is provided on a cutting-feeding table of the wire saw and which has horizontal and vertical reference surfaces perpendicularly intersecting a cutting plane, so that the central axis of the work piece automatically and perpendicularly intersects the cutting plane. Then, the mounting jig is tilted to tilt the work piece by a tilting mechanism in such a manner that the central axis is inclined against the cutting plane at a predetermined angle on the basis of shift value data of the crystal orientation with the central axis of the work piece a reference, which has previously been measured outside the wire saw.

2 Claims, 11 Drawing Sheets

METHOD OF POSITIONING WORK PIECE AND SYSTEM THEREFOR

This is a Continuation of application Ser. No. 08/438,271 filed May 10, 1995, now abandoned.

BACKGROUND OF THE INVENTION

1. Field of the Invention

This invention relates to a method of positioning a work piece and a system therefor, and more particularly to a method of positioning a work piece when a columnar work piece such as a semiconductor ingot is cut into a multitude of thin sheet-shaped wafers by a running wire saw, and a system therefor.

2. Description of the Related Art

One of devices for cutting a work piece such as a columnar semiconductor ingot is a wire saw. In this wire saw, wires are guided around a plurality of grooved rollers to form wire rows, and ends on one side of the wires are wound around one of wire reels and ends on the other side are wound around the other wire reels. Then, when the wires reciprocally run between one of the wire reels and the other at a high speed, the work piece is vertically moved and pressed against the horizontal wire rows, and a working solution containing abrasive grains is supplied to the wire rows, so that the work piece can be cut into a multitude of thin sheet-shaped wafers by lapping action of the abrasive grains.

Then, when the semiconductor ingot (hereinafter referred to as a "work piece") formed of a single crystal material for example is cut by the wire saw, it is necessary to cut the work piece after the work piece is positioned in such a manner that a cut surface of the work piece is set at a predetermined angle, such for example as a crystal orientation.

As a method of positioning the work piece for arranging the crystal orientation, there has heretofore been disclosed one Japanese Patent Application Laid-open No.3-10760. According to this method, individual wire saws are each provided with a gonio angle measuring meter and a gonio angle setting device, whereby the inclination of a push-up base for supporting the work piece is adjusted by the gonio angle setting device on the basis of the result of the crystal orientation of the work piece which has been measured directly in a state where the gonio angle measuring meter is mounted. There is another method, in which a measuring device provided with the gonio angle measuring meter and the gonio angle setting device is provided in addition to the wire saws each of which is provided with the gonio angle measuring meter and the gonio angle setting device, and the gonio angle setting device of this measuring device is connected on line to the gonio angle setting devices of the wire saws, whereby the operating conditions of the gonio angle setting device, which are obtained by this measuring device, are outputted to the gonio angle setting devices of the wire saws.

Furthermore, as another method, there is one, in which the reference of the work piece is matched with the reference of the wire saw and the like by an optical system (microscope), and thereafter, the work piece is inclined by a predetermined angle on the basis of the information on the crystal orientation, which has been previously measured.

However, the method disclosed in Japanese Patent Application Laid-open No.3-10760 presents a disadvantage in that the costs of the system are increased because the gonio angle measuring meters are mounted on the respective wire saws. Furthermore, according to the method, in which the measuring device provided with the gonio angle setting device is provided in addition to the wire saws, the measuring device should be provided with the gonio angle setting device, so that the costs of the system are increased. On the other hand, according to the method of using the optical system, it takes much time for matching the reference of the work piece with the reference of the wire saw and the like, thus presenting the disadvantage in that the working efficiency deteriorates.

In view of these problems, a necessity has been voiced for an inexpensive system, in which the work piece can be easily and quickly positioned at a predetermined reference angle, e.g., a crystal orientation of the work piece at the time of cutting the work piece.

Furthermore, such a problem at the time of cutting the work piece at a predetermined reference angle is presented that, even if the work piece is positioned at the predetermined reference angle, when a worker has incorrectly stretched a wire on a roller by one groove (1 pitch: about 0.5 mm), or when the position of a groove on the grooved roller is shifted, there may be a case where the work piece is cut in such a manner that the angle of the work piece is shifted in the horizontal direction by a shift value.

SUMMARY OF THE INVENTION

The present invention has been developed to eliminate the above-described disadvantages and has as its object the provision of a method of positioning a work piece at a predetermined reference angle, e.g., a crystal orientation, and a system therefor, whose costs are inexpensive.

Furthermore, the present invention has been developed to eliminate the above-described disadvantages and has as its another object the provision of a system for positioning a work piece, which can be free from the adverse influence of a mistake in stretching wire rows of a wire saw.

To achieve the above-described objects, an invention disclosed in claim 1 is characterized in that a system for arranging the crystal orientation at the time of cutting a single crystal material, wherein arrangement of the crystal orientation of the single crystal material is made in such a manner that a cut surface forms a predetermined crystal orientation when the rod-shaped single crystal material is cut into wafers by wire rows of a wire saw, comprises: a work piece bonding block having respective horizontal and vertical reference surfaces; a bonding jig provided separately from the aforesaid wire saw, for positioning and bonding the aforesaid single crystal material to the aforesaid work piece bonding block in such a manner that the central axis of the single crystal material comes to be in parallel to the respective horizontal and vertical surfaces of the work piece bonding block in a state where references such as an orientation flat and the like formed on the aforesaid single crystal material are located at a predetermined position; a mounting jig provided on a cutting-feeding table of the aforesaid wire saw and having respective horizontal and vertical reference surfaces which are perpendicularly intersecting the cut flat surface formed by a cutting-feeding direction of the aforesaid cutting-feeding table and a running direction of the aforesaid wire rows, for making the central axis of the aforesaid single crystal material to perpendicularly intersect the cut flat surface by positioning and mounting the aforesaid work piece bonding block in a state where reference surfaces of the aforesaid work piece bonding block are matched with the aforesaid reference surfaces; and a tilting mechanism for tilting the single crystal material in such a manner that the aforesaid central axis is inclined to the aforesaid cut flat surface at a predetermined angle on the basis of shifted value data of the crystal orientation with the central axis of the aforesaid single crystal material a reference, which is previously measured outside the wire saw.

Furthermore, to achieve the above-described objects, an invention disclosed in claim 7 is characterized in that a wire saw for cutting the aforesaid work piece into a multitude of thin sheet-shaped wafers in such a manner that the work piece held by a work piece holding member is pressed against the running wire rows in a state of being set at a predetermined reference angle, comprises: a rocking means for rocking the aforesaid work piece holding member with respect to the running direction of the surfaces of the wire rows; a contacting means which is mounted on the aforesaid work piece holding member, and which contacts the wires of the aforesaid wire rows when the work piece holding member is rocked by the aforesaid rocking means; and a control means for controlling the aforesaid rocking means in such a manner that a rotational angle on one side, which is obtained by contact of the contact means with-the wire of the wire rows and a rotational angle on the other side, which is obtained by rocking the contact means in the reverse direction are calculated on the basis of the predetermined reference angle and the aforesaid work piece holding member is positioned at the predetermined angle on the basis of the rotational speed thus calculated.

According to the invention disclosed in claim 1, firstly, the rod-shaped single crystal material is positioned and bonded to the work piece bonding block by means of the bonding jig provided separately from the wire saw in such a manner that the central axis of the single crystal material is in parallel to the respective horizontal and vertical reference surfaces of the work piece bonding block. Secondly, the aforesaid work piece bonding block is positioned and mounted at the mounting jig which respectively has horizontal and vertical reference surfaces perpendicularly intersecting the cutting plane formed the cutting-feeding direction of the cutting-feeding table and the running direction of the aforesaid wire rows. With this arrangement, the central axis of the aforesaid single crystal material automatically and perpendicularly intersects the cutting plane surface. Subsequently, the single crystal material is tilted by the tilting mechanism in such a manner that the aforesaid central axis is inclined at a predetermined angle to the aforesaid cutting plane on the basis of the shift value information of the crystal orientation with the central axis of the single crystal material a reference, which has been previously measured at the outside of the wire saw. That is, a simple member and simple jigs such as the work piece bonding block, the bonding jig and the mounting jig are used to set the central axis of the single crystal material against the cutting plane at a predetermined angle (in this case, perpendicularly intersecting), and then, the single crystal material is tilted in such a manner that the aforesaid central axis is inclined at a predetermined angle against the cutting plane (an inclination, at which the cut surface of the single crystal material which is cut off is set at the crystal orientation) on the basis of the shift value information of the crystal orientation with the central axis a reference, which has been previously measured.

Furthermore, according to the invention disclosed in claim 7, check is made as to whether or not the work piece held by the work piece holding member is set at a correct predetermined reference angle against the wire rows. Then, when the work piece is not correctly set (for example, when there is a mistake in stretching the wire rows by one groove, the work piece is shifted by this value from the correct predetermined angle), the shift is automatically corrected. First, the control means drives the rocking means to rock the work piece holding member to one side. Then, the contact means secured to the work piece holding member is brought into contact with the wire of the wire rows, and, when the contact means comes into contact with the wire of the wire rows, rocking of the rocking means stops, whereby a rotational angle, through which the contact means comes into contact with the wire of the wire rows, is calculated and stored.

Subsequently, the control means drives the rocking means to return the work piece holding member to the initial position, and the contact means is rocked to the other side to perform the similar operation. Then, the control means determines whether or not the work piece is set at the predetermined reference angle against the wire rows or not on the basis of the rotational angles to one side and to the other side, which are obtained as described above. In this case, when the work piece is not set at the predetermined reference angle against the wire rows, the work piece holding member is rocked by the rocking means to correctly set the work piece at the predetermined reference angle.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same of similar parts throughout the figures thereof and wherein.

DESCRIPTION OF THE PREFERRED EMBODIMENTS

Detailed description will hereunder be given of the preferred embodiments of a method of positioning a work piece and a system therefor according to the present invention with reference to the accompanying drawings.

Figure 1:
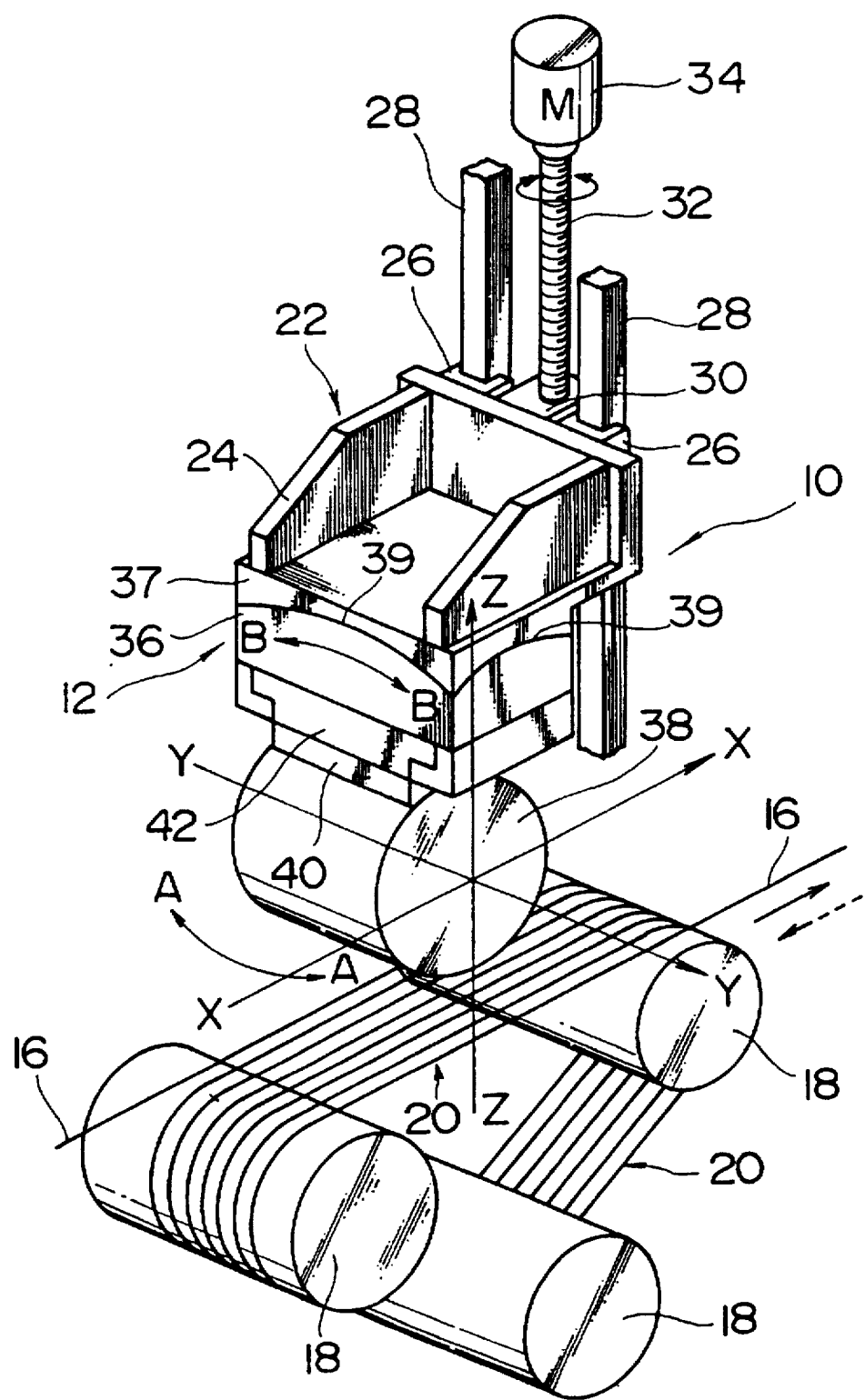
FIG. 1 is a view explaining a first embodiment of the system for positioning the work piece according to the present invention and an oblique view, in which the mounting jig according to the present invention is assembled in the cutting-feeding table of the wire saw.
Figure 2:
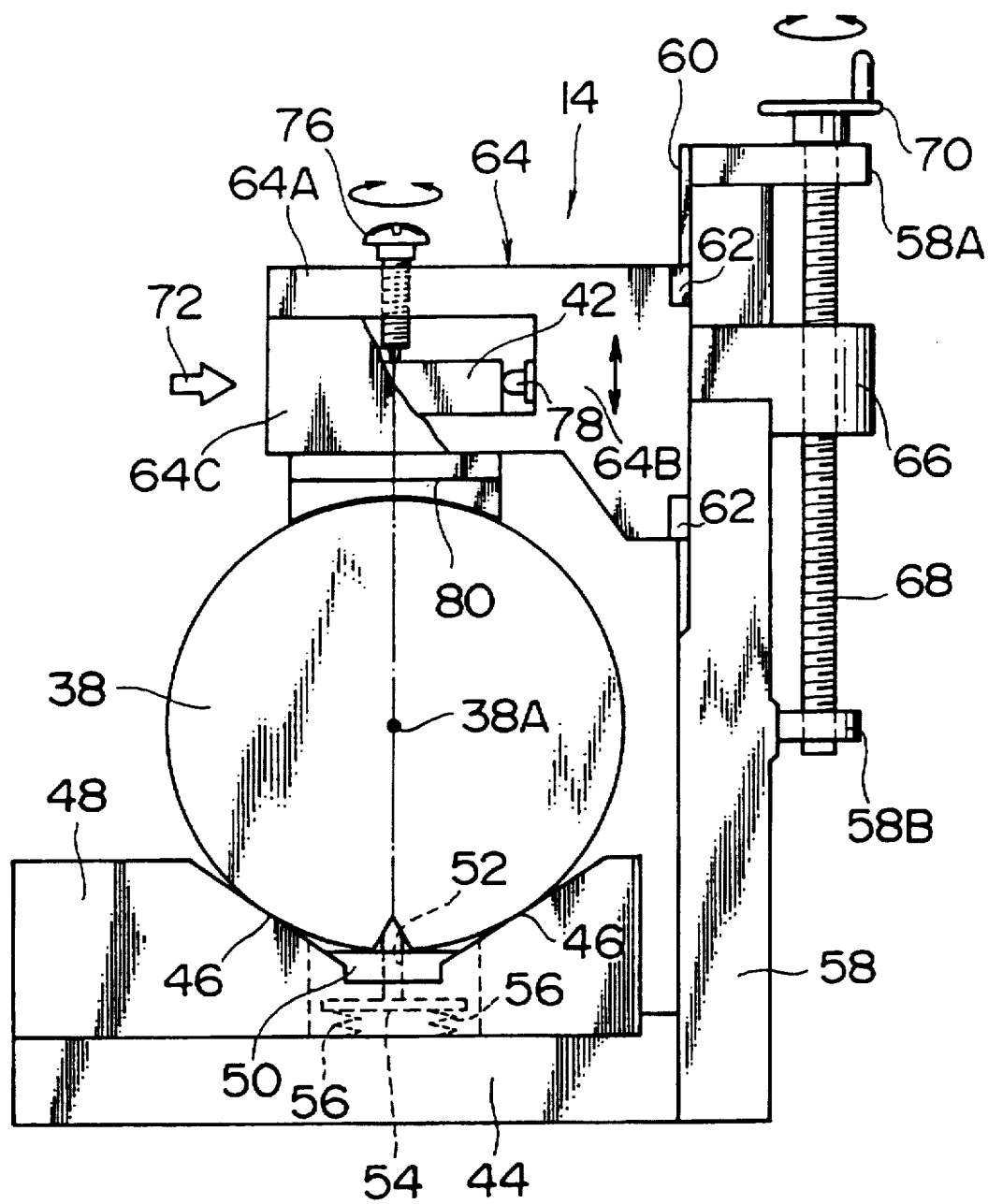
FIG. 2 is a partially cutaway side view showing the bonding jig in the first embodiment of the system for positioning the work piece according to the present invention and explaining the interior thereof.
Figure 3:
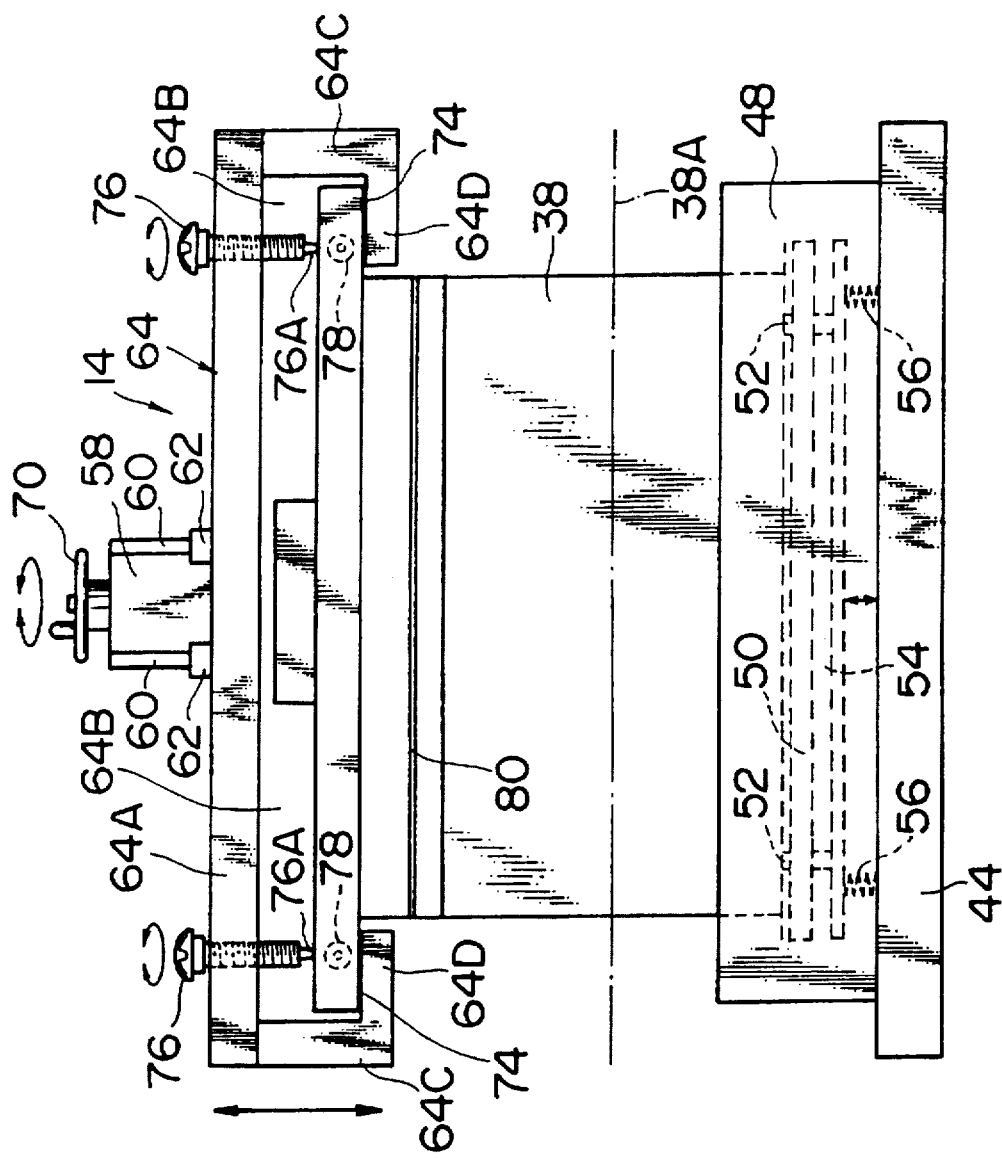
FIG. 3 is a front view showing the bonding jig.
Figure 4B:
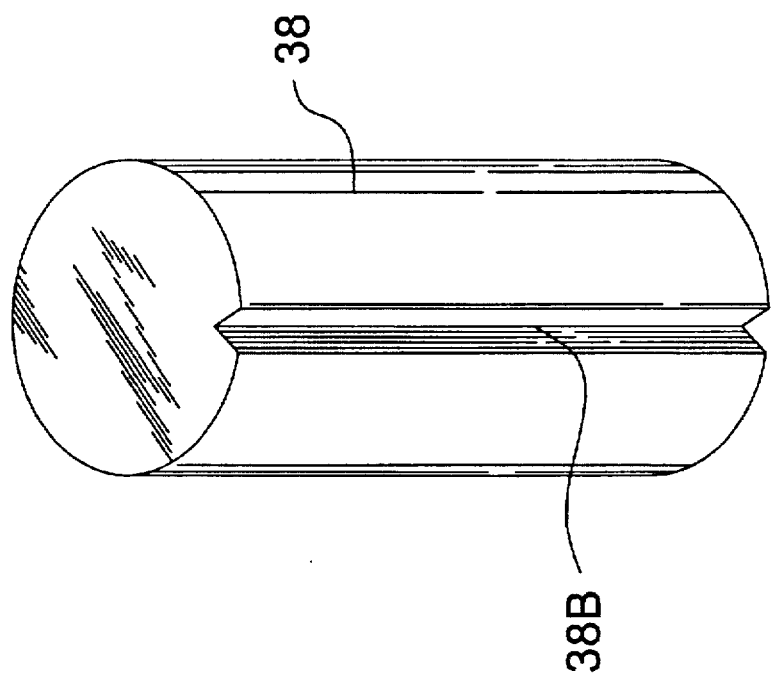
FIG. 4(B) is an oblique view showing a notch formed on the semiconductor ingot.
Figure 4A:
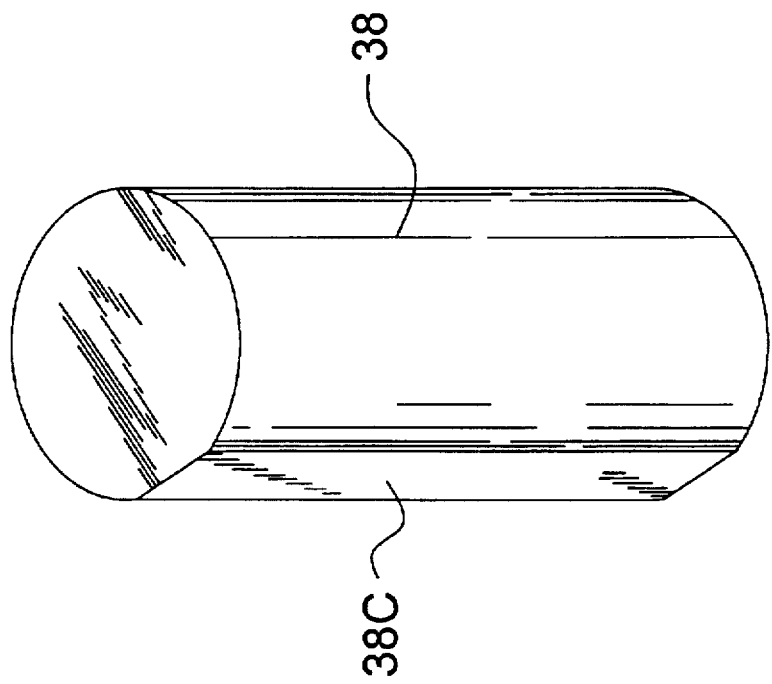
FIG. 4(A) shows the orientation flat formed on the semiconductor ingot.
Figure 5:
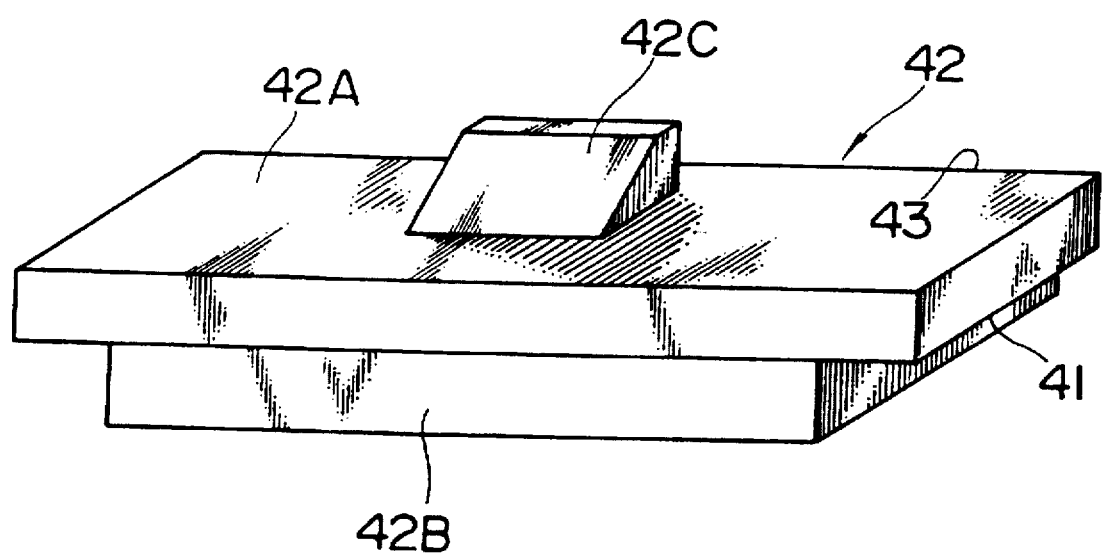
FIG. 5 is an oblique view showing the work piece bonding block in the first embodiment of the system for positioning the work piece according to the present invention.
Figure 6:
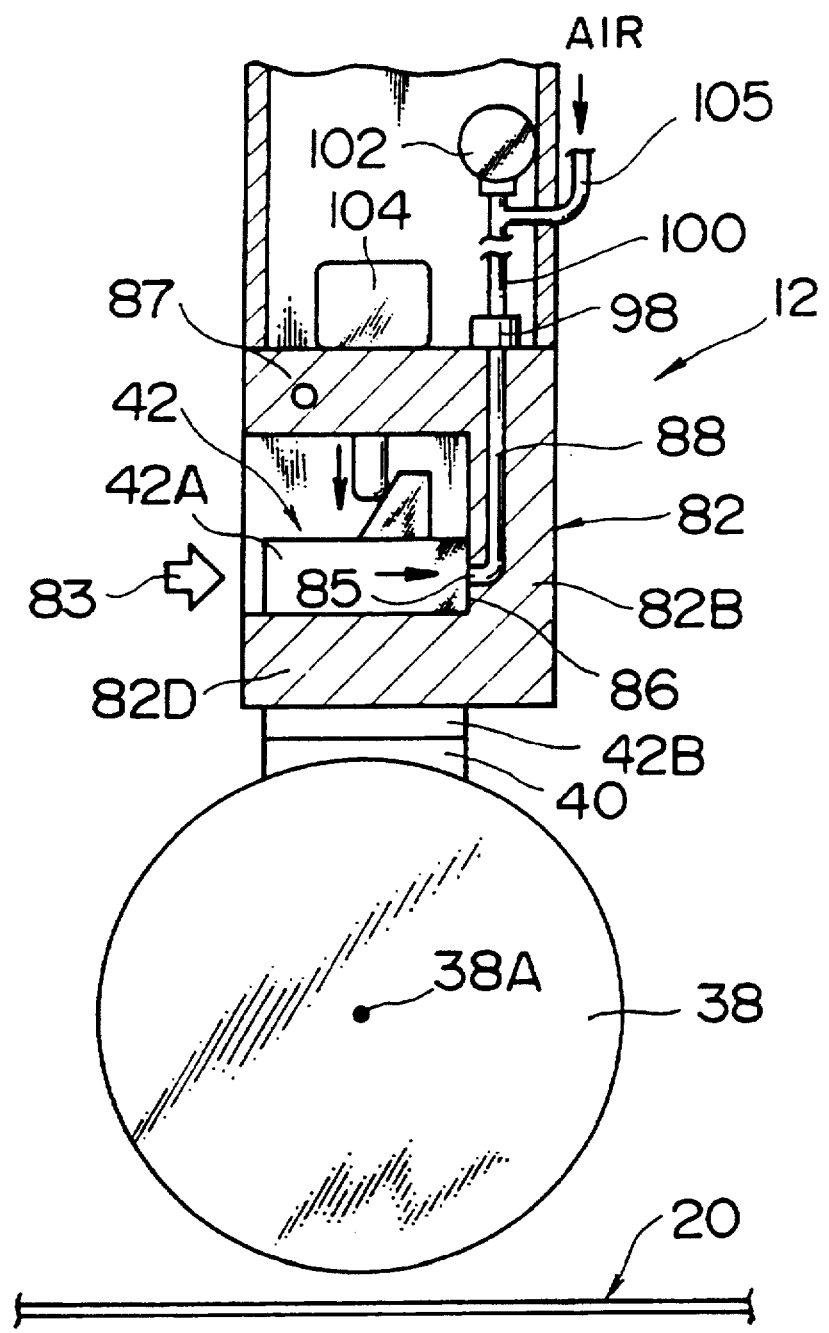
FIG. 6 is a side view showing a partial section of the mounting jig in the first embodiment of the system for positioning the work piece according to the present invention.
Figure 7:
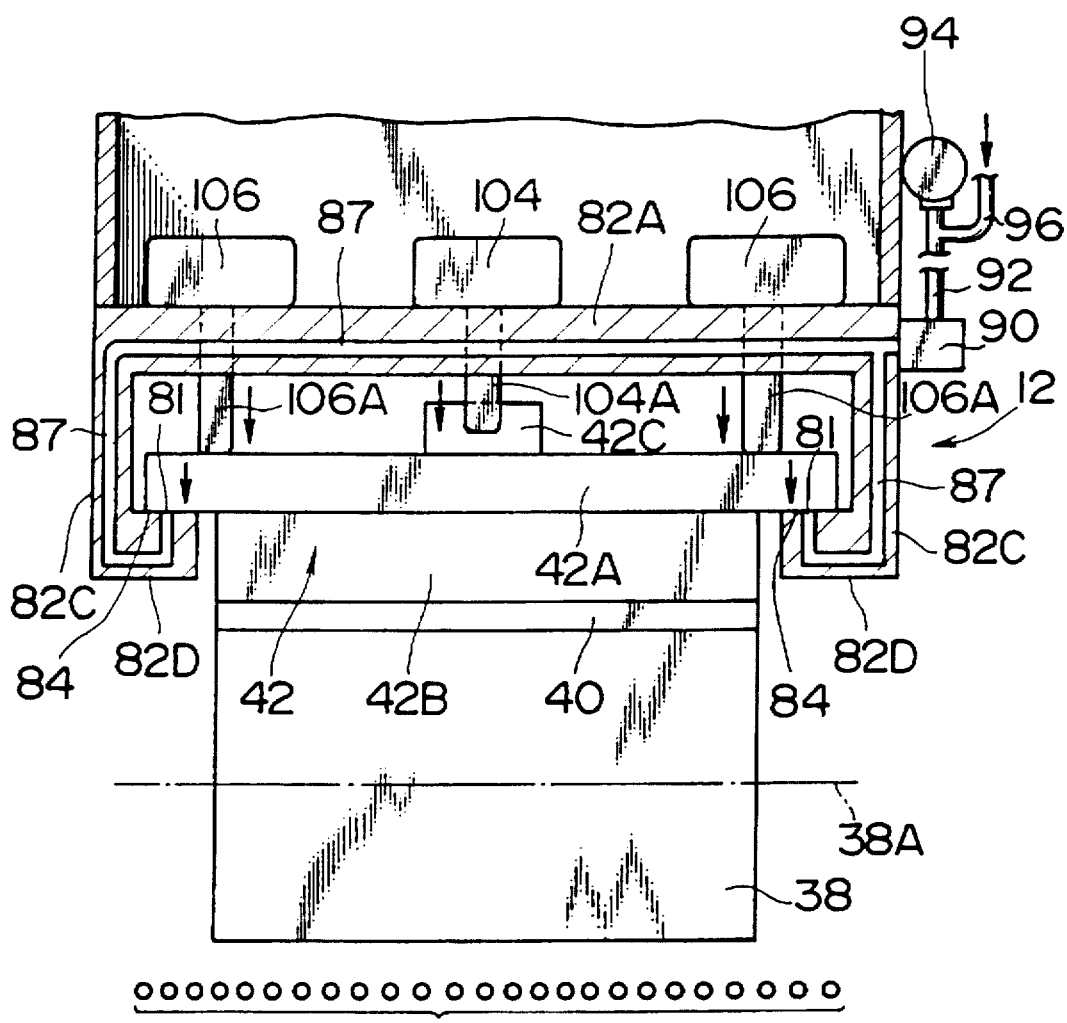
FIG. 7 is a front view showing a partial section of the mounting jig.

FIGS. 1 through 7 are views explaining the first embodiment of the present invention. In the first embodiment, when a columnar work piece formed of a single crystal material, e.g., a semiconductor ingot (hereinafter referred to as a "work piece") is cut into wafers, the work piece is positioned at a predetermined reference angle, e.g. a crystal orientation. FIG. 1 is an oblique view showing a wire saw 10, to which is applied a method of positioning a work piece according to the present invention, with a mounting jig 12 according to the present invention being assembled into a cutting-feeding table 22. Furthermore, FIGS. 2 and 3 are a side view and a front view of a bonding jig 14 according to the present invention. Furthermore, FIGS. 6 and 7 are a side view and a front view of the bonding jig 12 according to the present invention.

A cutting mechanism in the wire saw 10 will be explained prior to explaining the aforesaid bonding jig 14 and mounting jig 12. As shown in FIG. 1, a wire 16 unwound from one reel,not shown, is successively guided around a plurality of grooved rollers 18, 18 . . . to form wire rows 20 and wound up by the other reel, not shown. Furthermore, the cutting-feeding table 22 is provided above the wire rows 20, and a slide member 24 of this cutting-feeding table 22 is slidably supported by a pair of parallel guide rails 28 and 28 which are vertically provided with a plurality of linear bearings 26, 26. . . . Furthermore, a nut member 30 fixed to the slide member 24 is engaged with a lead screw 32 provided along the guide rails 28, and the lead screw 32 is rotated by a motor 34 which rotates in forward and reverse directions. Accordingly, when the lead screw 32 is rotated by the motor 34, the cutting-feeding table 22 is vertically moved (direction Z—Z in the drawing).

Furthermore, the mounting jig 12 is supported at the bottom of the slide member 24, and the mounting jig 12 comprises a tilting mechanism section for tilting the mounting jig 12 and a clamp mechanism section for positioning and mounting a work piece bonding block 42, to which a work piece 38 as being a member to be cut is bonded through a slice base 40. Furthermore, the aforesaid tilting mechanism section is constructed in such a manner that a tilting column 36 slidably supported by a semispherical sliding surface 39 of a tilting base 37 is rocked horizontally (direction A—A about the Z axis in the drawing) and vertically (direction B—B about the X axis in the drawing) by a tilting device housed in the tilting column 36.

When the work piece 38 is cut by the wire saw 10, the cutting-feeding table 22 is moved in a cutting-feeding direction (direction of the wire rows Z—Z in the drawing), the work piece 38 is pressed against the wire rows 20 which runs at a high speed in a running direction of the wire 16 (direction X—X in the drawing), and a working solution is supplied to the wire rows 20. With this arrangement, the work piece 38 is cut into a multitude of thin sheet-shaped wafers by lapping action of the working solution supplied to the wire rows 20.

Subsequently, the bonding jig 14 provided separately from the wire saw 10 according to the present invention will hereunder be described with reference to FIGS. 2 and 3. Incidentally, an orientation flat 38C or a notch 38B is formed on the work piece 38 in the longitudinal direction thereof so that an orientation direction can be recognized when the wafers are formed (refer to FIG. 4).

As shown in FIGS. 2 and 3, a V block 48 (cradle), on which a V-shaped groove 46 is formed in the longitudinal direction, is fixed onto a base 44. Furthermore, a block 50 for an orientation flat is provided on the bottom portion of the groove 46 of the V block 48 in the horizontal direction along the groove 46. Furthermore, through-holes are formed at opposite end sides in the longitudinal direction of the block 50 for the orientation flat, and pins 52 for notches, each of which has a pointed forward end, are movably penetrated through these through-holes. Furthermore, base ends of the pins 52 for the notches are supported by a fixing base 54, and a plurality of compression springs 56, 56 . . . are provided between the fixing base 54 and the base 44. With this arrangement, when the forward end portions of the pins 52 for the notches are pressed, the forward ends of the pins 52 for the notches, which project from the block 50 for the orientation flat, are hidden in the through-holes. Then, in the case of the work piece 38 on which the orientation flat 38C is formed, the orientation flat 38C is positioned by the block 50 for the orientation flat. In the case of the work piece 38 on which the notch 38B is formed, the forward ends of the pins 52 for the notches project into the notches 38B to position the notch 38B.

Furthermore, a vertical support 58 is fixed to the base 44 and a pair of parallel guide rails 60 and 60 are vertically provided on the support 58. Furthermore, a support member 64 is slidably supported on the guide rails 60 with a plurality of linear bearings 62, 62 . . . and a lead screw 68, whose top and bottom ends are rotatably supported by bearings 58A and 58B which are provided on the support 58, is engaged with a nut member 66 secured to the support member 64. Furthermore, a handle 70 is provided on the top of the lead screw 68. With this arrangement, when the handle 70 is rotated, the support member 64 is vertically moved along the guide rails 60.

Furthermore, a main body of the support member 64 includes a top plate 64A, a back plate 64B and opposing side plates 64C and 64C, and is in the form of a hollow quadrangular body having an open front surface (a side indicated by an arrow mark 72 in FIG. 2) and an open bottom surface (Refer to FIG. 3). Furthermore, the opposing side plates 64C and 64C are arranged in a state where letters L face each other, and horizontal reference surfaces 74 are formed on horizontal portions 64D of the L letters. Furthermore, abutting blocks 78 and 78 are provided at opposite ends of the back plate 64B in the support member 64 to thereby form vertical references. Furthermore, through-holes are formed at opposite ends of the top plate 64A, and these through-holes are internally engaged with a female screw, whereby bolts 76 and 76 are engaged with the through-holes. With this arrangement, when the bolt 76 is rotated, a projection value of the forward end of the bolt 76, which projects into the support member 64, changes.

A description will hereunder be given of a method of using the bonding jig 14. The work piece 38 is laterally laid along the groove 46 of the V groove 48, and the notches 38B of the work piece 38 are positioned by the pins 52 for the notches (in this case, the work piece on which the notch is formed). At this time, the support member 64 is positioned upwardly so as to be ready for being rested on the V block 48. On the other hand, the work piece bonding block 42 (refer to FIG. 5) including: a rectangular parallelepiped-shaped upper block 42A each of which has horizontal and vertical reference surfaces 41 and 43; and a rectangular parallelepiped-shaped lower-block 42B which has a smaller size than the upper block 42A; is inserted into the support member 64 from the forward position and racked across the horizontal portions 64D of the opposing side plates 64C and 64C. Then, in a state where the vertical reference surface 43 of the work piece bonding block 42 is abutted against the abutting blocks 78, the work piece bonding block 42 is pushed downwardly by the bolts 76, and the work piece bonding block 42 is fixed in a state where the horizontal reference surface 41 of the work piece bonding block 42 is abutted against the horizontal reference surfaces 74 of the opposing side plates 64C and 64C. With this arrangement, the central axis 38A of the work piece 38 is brought into parallel to the respective reference surfaces 41 and 43 of the work piece bonding block 42. Subsequently, the support member 64 is made to approach the work piece 38, and the work piece bonding block 42 is bonded to the work piece 38 by an adhesive 80 through the slice base 40. At this time, the work piece bonding block 42 can be additionally used as the slice base 40 and the use of the slice base 40 can be dispensed with. In this bonding operation, when a space is formed between the work piece bonding block 42 and the slice base 40, the space is filled with the adhesive 80. With this arrangement, bonding can be made through the slice base 40 in the state where the central axis 38A of the work piece 38 is brought into parallel to the respective reference surfaces 41 and 43 of the work piece bonding block 42.

A description will hereunder be given of the mounting jig 12 provided on the cutting-feeding table 22 of the wire saw 10 with reference to FIGS. 6 and 7.

As shown in FIGS. 6 and 7, the mounting jig 12 is composed of a clamp mechanism section 82 and a tilting mechanism section, not shown. Just like the support member 64 of the bonding jig 14, the clamp mechanism section 82 includes a top plate 82A, a back plate 82B and opposing side plates 82C and 82C, and is in the form of a hollow quadrangular body having an open front surface (a side indicated by an arrow mark 83 in FIG. 6) and an open bottom surface (Refer to FIG. 7). Furthermore, the opposing side plates 82C and 82C are arranged in a state where letters L face each other, and horizontal reference surfaces 84 are formed on horizontal portions 82D of the L letters. Furthermore, a vertical reference surface 86 is formed on the surface of the back plate 82B in the clamp mechanism section 82. In the central portion of the top plate 82A, there are provided a first clamp cylinder 104 for positioning and clamping the vertical reference surface 43 of the work piece bonding block 42 by abutting it against a vertical reference surface 86 of the clamp mechanism section 82, and, at opposite ends of the top plate 82A, there is provided second clamp cylinders 106 and 106 for positioning and clamping the horizontal reference surface 41 of the work piece bonding block 42 by abutting it against the horizontal reference surface 84 of the clamp mechanism section 82. Furthermore, cylinder rods 104A and 106A of the respective clamp cylinders 104 and 106 pass through through-holes formed in the top plate 82A and are stretched or shrunk in the clamp mechanism section 82. Furthermore, open ends 81 and 85 of air flow paths 87 and 88 are formed in the horizontal reference surface 84 and the vertical reference surface 86, which are formed in the clamp mechanism section 82. Then, the first air flow path 78 connected to the open end 81 of the horizontal reference surface 84 is communicated with a first connecting member 90 formed in the opposing side plates 82C, 82C and the top plate 82A and fixed to the outside of one of the side plate 82C, and a first air piping 92 connected to the first connecting member 90 is connected to a first pressure gauge 94. Furthermore, a first air hose 96 forked from the middle portion of the first air piping 92 is connected to a compressor, not shown. On the other hand, the second air flow path 88 connected to the open end 85 of the vertical reference surface 86 is communicated with a second connecting member 98 formed in the back plate 82B and fixed to the outside of the top plate 82A, and a second air piping 100 connected to the second connecting member 98 is connected to a second pressure gauge 102. Furthermore, a second air hose 105 forked from the middle portion of the second air piping 98 is connected to the aforesaid compressor. Then, air from the compressor is adapted to constantly blow from both open ends 81 and 85. With this arrangement, when the open ends 81 and 85 are shut off, pressure in the air flow paths 87 and 88 is raised, and this rise in pressure is detected by the pressure gauges 94 and 102, so that there can be formed a seat confirming sensor for confirming that the respective reference surfaces 41 and 43 of the work piece bonding block 42 are correctly seated on the respective reference surfaces 84 and 86 of the clamp mechanism section 82.

A description will hereunder be given of the method of using the mounting jig 12. The work piece bonding block 42 positioned and bonded to the work piece 38 with the slice base 40 inserted into the clamp mechanism section 82 from the forward position, and racked across the horizontal portions 82D of the opposing side plates 82C. Subsequently, the first clamp cylinder 104 is operated to stretch the cylinder rod 104A, whereby an inclined surface of an abutting member 42C secured to the upper side of the central portion of the work piece bonding block 42 is pushed. With this operation, the work piece bonding block 42 is moved toward the back plate 82B of the clamp mechanism section 82, whereby the vertical reference surface 43 of the work piece bonding block 42 is abutted against the vertical reference surface 86 of the clamp mechanism section 82. Subsequently, the second clamp cylinder 106 is operated to stretch the cylinder rod 106A, whereby the horizontal reference surface 41 of the work piece bonding block 42 is abutted against the horizontal reference surface 84 of the clamp mechanism section 82. In this state, the first and second clamp cylinders 104 and 106 are locked, whereby the work piece bonding block 42 is clamped so as not to move. In this case, seat confirming sensors are provided on the horizontal reference surface 84 and the vertical reference surface 86 of the clamp mechanism section 82, so that reliable confirmation can be made as to whether the respective reference surfaces of the work piece bonding block 42 and the clamp mechanism section 82 are correctly abutted against each other.

A description will hereunder be given of the method of positioning the work piece for positioning the work piece so that the cut surface of the work piece can be set at the predetermined crystal orientation according to the present invention.

Firstly, by means of the bonding jig 14 provided separately from the wire saw 10, the work piece 38 which is positioned and bonded to the work piece bonding block 42 with the slice base 40 so that the central axis 38A of the work piece 38 is brought into parallel to the respective horizontal and vertical reference surfaces 41 and 43 of the work piece bonding block 42 in a state where the reference of the orientation flat or the notch which is formed on the work piece 38 is located at the predetermined position by the block 50 for the orientation flat or the pins 52 for the notches. Subsequently, the work piece bonding block 42 is positioned and mounted at the clamp mechanism section 82 of the mounting jig 12 which is provided on the cutting-feeding table 22 and has the respective horizontal and vertical reference surfaces 84 and 86 which perpendicularly intersects the cutting plane (plane Z–X in Fig.1). With this arrangement, the central axis 38A of the work piece 38 automatically and perpendicularly intersects the cutting plane. Subsequently, the mounting jig 12 is inclined so that the central axis 38A of the work piece 38 is inclined against the aforesaid cutting plane at a predetermined angle on the basis of the shift value information of the crystal orientation with the central axis 38A of the work piece 38 a reference, which has been previously measured outside the wire saw 10 (for example, measured by the gonio angle measuring meter). With this arrangement, the work piece 38 is inclined against the cutting plane at a predetermined angle, so that the work piece 38 can be positioned so that the cut surface of the work piece 38 which has been cut is set at a predetermined crystal orientation.

As described above, in the method of positioning the work piece and the system therefor according to the present invention, by use of the simple member and jigs such as the work piece bonding block 42, the bonding jig 14 and the mounting jig 12, the central axis 38A of the work piece 38 can be easily and quickly set at the predetermined angle (perpendicularly intersecting, in this case) against the cutting plane, and the work piece 38 can be inclined to the cutting plane so that the central axis 38A is inclined at the predetermined angle against the cutting plane (such an inclination that the cut surface of the work piece 38 which has been cut is set at a predetermined crystal orientation) on the basis of the shift value information of the crystal orientation with the central axis 38A a reference, which has been previously measured, so that positioning can be performed easily and quickly with costs of the system low as compared with the conventional method. Accordingly, the working efficiency for positioning the work-piece 38 can be improved.

Furthermore, the clamp mechanism section 82 incorporated in the mounting jig 12 is constructed in such a manner that the work piece bonding block 42 can be automatically clamped by the first and second clamp cylinders 104 and 106, whereby the works in a contaminated chamber can be reduced as much as possible, so that the burden of a worker can be relieved. Though a detailed description is omitted, the tilting mechanism section is numerically controlled, whereby there is no difference in control accuracy between the workers, so that accurate and stabilized control can be performed. Furthermore, matching the crystal orientation can be performed in a short period of time as compared with the conventional method using the optical system, so that the working hours can be decreased. Incidentally, in the first embodiment, the method of positioning the work piece according to the present invention has been explained by the example, in which the method has been applied to the wire saw type slicing machine, however, the method may be applied to an inner circumferential blade type or an outer circumferential blade type slicing machine. Furthermore, the work piece has been explained by the example of the semiconductor ingot, however, the invention can be applied to all of the work pieces which are required to be positioned in the crystal orientation or at the predetermined reference angle. Furthermore, as shown in FIG. 1, the cuttingfeeding direction is Z—Z and the running direction of the wire rows is X—X, however, the system may be provided so that the cutting-feeding direction is X—X and the running direction of the wire rows is Z—Z, i.e., the work piece is cut laterally with respect to the vertical wire rows. Furthermore, when the work piece bonding block is mounted at the mounting jig, the central axis of the work piece perpendicularly intersects the cutting plane. This is the most proper example. As the case may be, the central axis of the work piece may be set at a predetermined reference angle against the cutting plane. Furthermore, the tilting mechanism is housed in the mounting jig, however, the mounting jig may be tilted from outside the mounting jig.

A description will hereunder be given of the second embodiment of the system for positioning the work piece of the wire saw according to the present invention.

Figure 8:
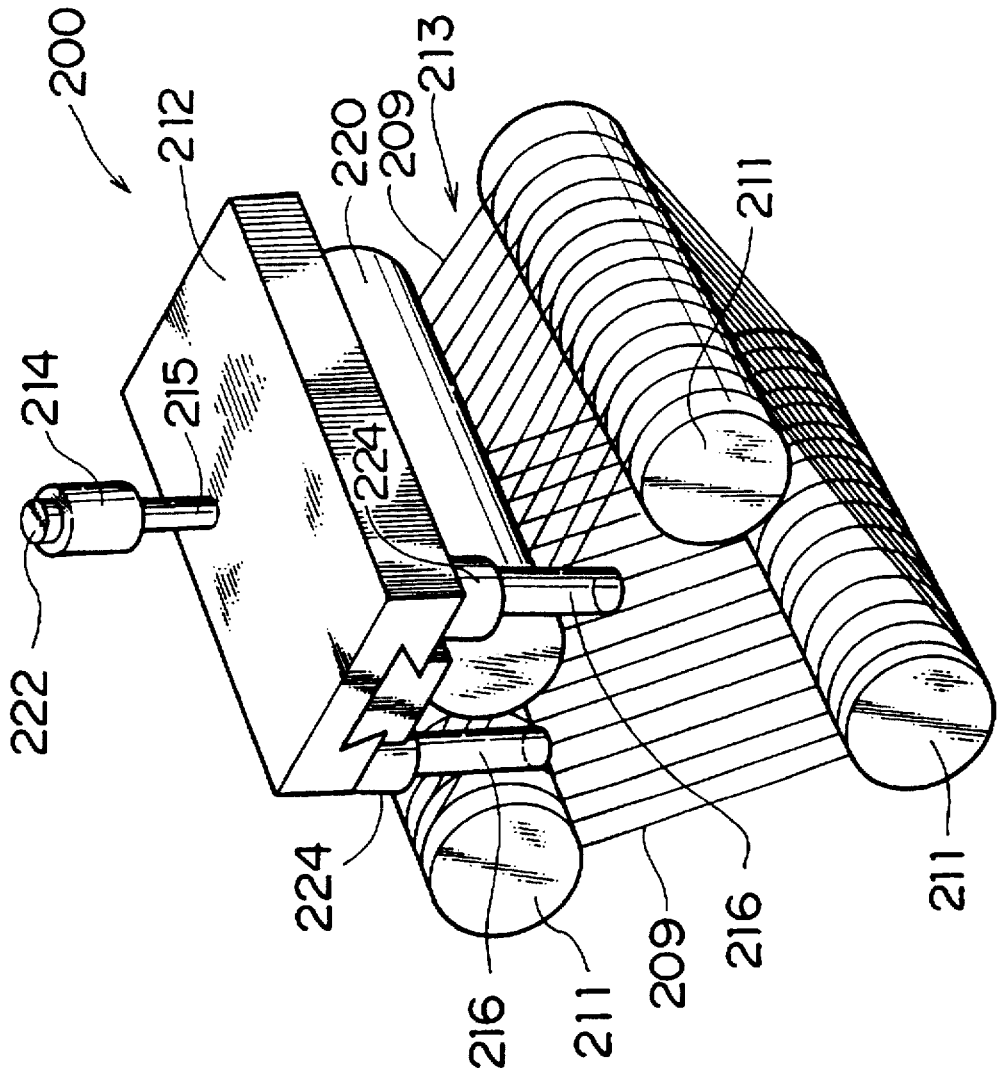
FIG. 8 is an oblique view explaining a second embodiment of the system for positioning the work piece according to the present invention.

FIGS. 8 though 11 are the views explaining the system for positioning in the second embodiment. In the system for positioning the second embodiment, check is made as to whether or not the work piece held by the work piece holding member is positioned against the wire rows at the correct predetermined reference angle, and, when the correct positioning is not made (for example, at the time of stretching the wire rows, since there is a mistake in stretching the wire rows, there is a shift from the correct predetermined angle by a value corresponding thereto), the shift is automatically corrected for correct repositioning.

Figure 9:
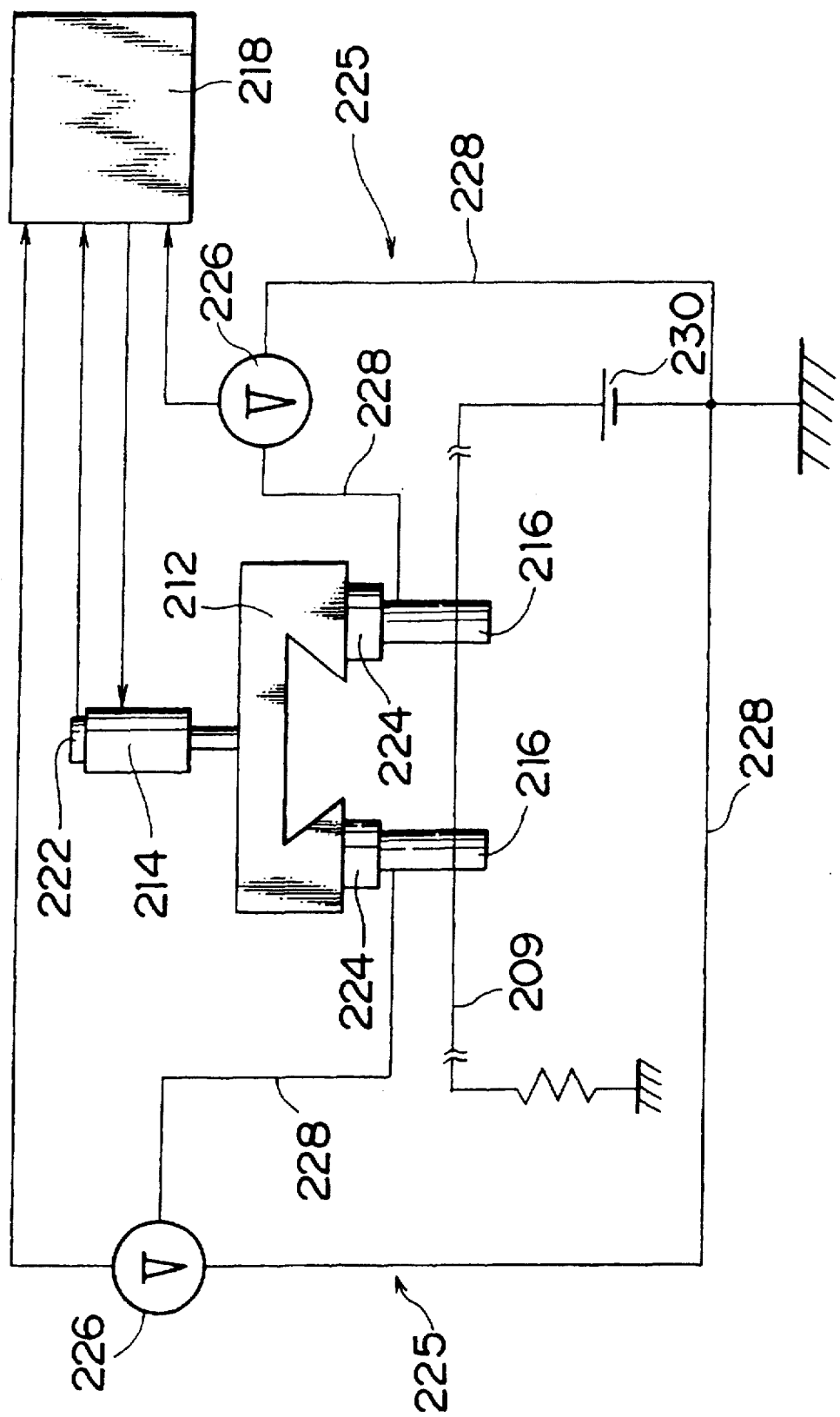
FIG. 9 is a block diagram explaining the second embodiment of the system for positioning the work piece according to the present invention.

FIG. 8 is the oblique view explaining the system for positioning the work piece of the wire saw in this embodiment, and FIG. 9 is the block diagram showing the construction of the system.

As shown in FIGS. 8 and 9, wire rows 213 are constructed in such a manner that wires 209 are guided around grooved rollers 211, 211 ... and stretched, and a system 200 for positioning the work piece which mainly comprises a work piece holder 212, a driving motor 214, rod-shaped contact shoes 216 and 216 and a control section 218 (refer to FIG. 9).

The driving motor 214 is constructed in such a manner that a rotary shaft 215 thereof is secured to the central portion of the work piece holder 212 and the work piece holder 212 is rocked in the horizontal direction with respect to the wire rows 213, thus forming a rocking power of the tilting mechanism in the horizontal direction. Furthermore, a rocking power for rocking the work piece holder 212 in the vertical direction is incorporated in the work piece holder 212, however, a detailed description thereof will be omitted because it is not the main part of the present invention. Furthermore, a pulse generator 222 is secured to the driving motor 214, and this pulse generator 222 outputs a number of pulses corresponding to a rotational angle of the driving motor 214 (for example, one pulse for one rotation) to the control section 218.

As the rod-shaped contact shoes 216 and 216, electrically conductive ones are used, and the contact shoes 216 and 216 are provided at both corners of one end of the work piece holder 212 with insulators 224 and 224.

The control section 218 controls the driving motor 214 and calculates a rotational angle of the driving motor 214 on the basis of the information outputted from the pulse generator 222. Then, an inclination in the horizontal direction with respect to the wire rows 213 of the work piece holder 212 is calculated from the rotational angle of the driving motor 214, and it is determined whether the work piece holder 212 is set at a correct horizontal reference angle with respect to the wire rows 213 or not, and, when a shift takes place, the driving motor 214 is driven by a value corresponding to the shift for correction.

Furthermore, as a means for sensing the contact of the contact shoes 216 and 216 with the wires 209 of the wire rows 213, a detection circuit 225 as shown in FIG. 9 is assembled. This detection circuit 225 includes the wire rows 213, the contact shoes 216 and 216, voltage sensors 226 and 226, a cable 228 and a power source 230. Voltage is applied to the wires 209 of the wire rows 213 by the power source 230, and, when the contact shoes 216 contact the wire rows 213, voltage takes place in the voltage sensor 226. Then, when the voltage sensor 226 senses the voltage, a signal is outputted to the control section 218, whereby the contact of the contact shoes 216 with the wires 209 of the wire rows 213 is transmitted to the control section 218.

A description will hereunder be given of the action of the system for positioning the work piece of the wire saw which is constructed as mentioned above.

Firstly, the work piece 220 is secured to the work piece holder 212 to match the horizontal and vertical references with each other, and the work piece holder 212 is set to be tilted by a predetermined reference angle with respect to the vertical direction by the tilting mechanism so that the work piece 220 can be cut in the desirable cutting direction. In this state, the work piece 220 matches the horizontal and vertical references with each other by means of the bonding jig 14 and the mounting jig 12 which are proposed in the first embodiment. In this case, if the wire rows 213 are correctly stretched, the horizontal and vertical references of the work piece 220 are matched with the horizontal and vertical references of the wire rows 213, however, when there is a mistake in stretching the wire rows 213 (for example, at the time of guiding the wires 209 around the grooved rollers 211, 211 . . . , an incorrect guiding by one groove takes place), the work piece 220 is shifted by a value corresponding to the incorrect guiding in the horizontal direction and cut.

Then, the system for positioning the work piece of the wire saw according to the present invention performs the following operations in order to avoid the above-described problems.

Figure 10:
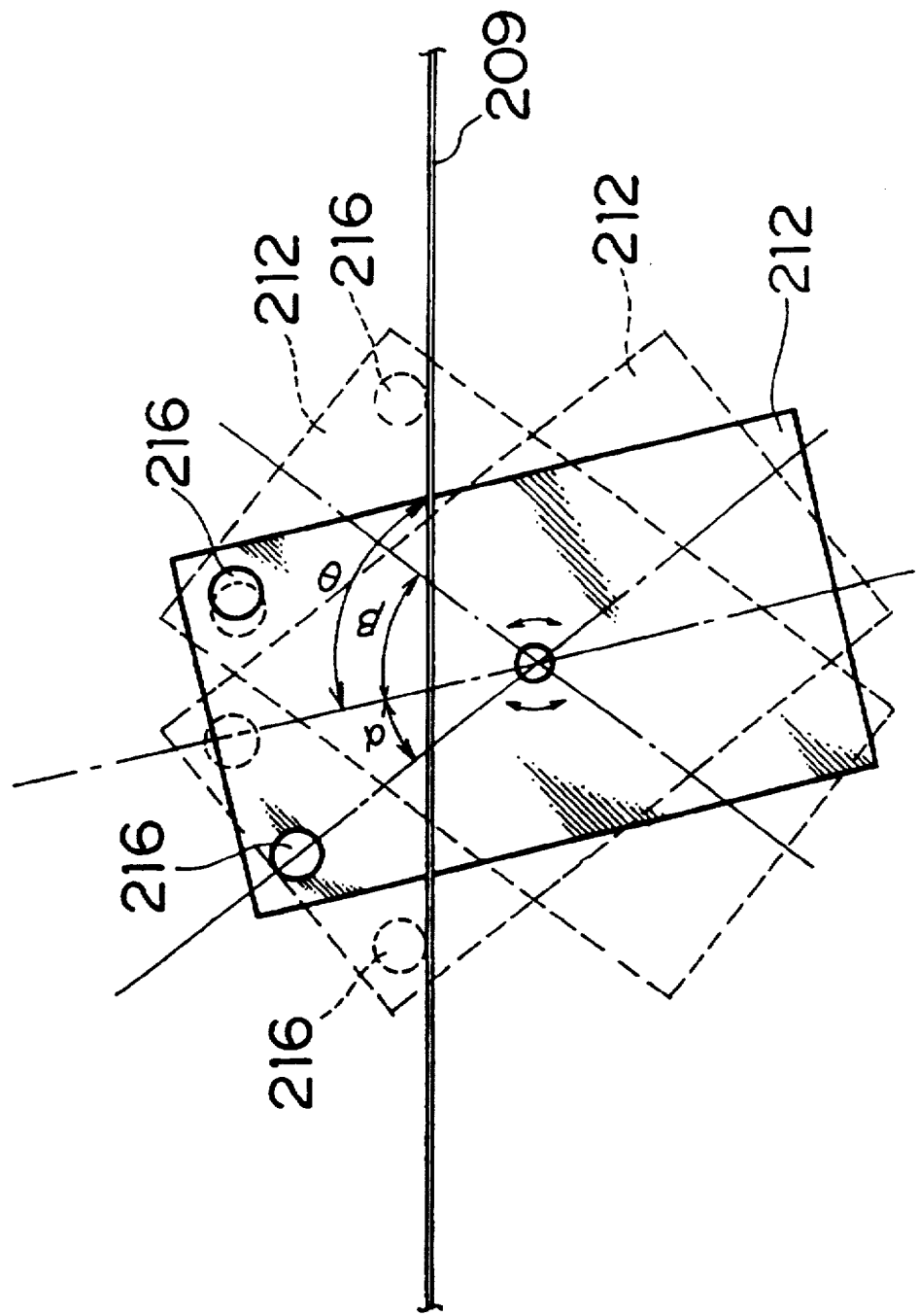
FIG. 10 is an enlarged view of the essential portions explaining the second embodiment of the system for positioning the work piece according to the present invention, and, FIG. 11 is a side view showing another mode of the second embodiment of the system for positioning the work piece according to the present invention and explaining an example, in which a limit switch is used in a contact sensing means.

Firstly, the control section 218 drives the driving motor 214 to rotate the work piece holder 212 to one side, and starts counting pulses outputted from the pulse generator 222. As the work piece holder 212 is rotated, one of the contact shoes 216 comes into contact with the wire 209 of the wire rows 218 at a certain rotational angle (refer to FIG. 10). At this time, an electric current passes through the detection circuit 225, whereby voltage takes place in the voltage sensor 226. Upon sensing this voltage, the voltage sensor 226 outputs a signal to the control section 218. Then, upon receiving the aforesaid signal, the control section 218 stops driving the driving motor 214, and calculates a rotational angle α of the driving motor 213 until the contact shoe 216 comes into contact with the wire 209 of the wire rows 213, from the total number of pulses outputted from the pulse generator 222 and stores it.

Subsequently, the control section 218 drives the driving motor in the reverse direction to return the work piece holder 212 to the initial position, rotates the work piece holder 212 to the other side to perform the similar operation, and calculates a rotational angle β of the driving motor 214 until the contact shoe 216 at the other side comes into contact with the wire 209 of the wire rows 213 (Refer to FIG. 10) and stores it in memory.

Then, the control section 218 calculates an inclination θ in the horizontal direction of the work piece 220 with respect to the wire rows 213 from the rotational angle α at one side and the rotational angle β at the other side. Then, the inclination θ thus calculated is compared with a horizontal component of the aforesaid predetermined reference angle, and, when they coincide with each other, cutting is started. However, when they do not coincide with each other, a shift value from the horizontal component of the aforesaid predetermined reference angle is calculated, the driving motor 214 is driven by the shift value, and the cutting is started after correction is made so that the work piece 220 can be set at the predetermined reference angle.

As described above, conventionally, when the reference matching has been performed for the wire rows 213, which are incorrectly stretched, by means of the reference of the machine, the work piece 220 is cut in the cutting direction which is shifted in the horizontal direction. However, according to the system for positioning the work piece of the wire saw in this embodiment, cutting is started after the aforesaid shift in the horizontal direction is sensed and corrected, so that, even if there is a mistake in stretching or installing the grooved rollers, there is no concern about producing any defective work piece 220.

Incidentally, in the second embodiment, the rotational angles are measured until the contact shoes 216 come into contact with the wire rows 213. However, the rotational angles may be measured until the contact shoes 216 return to the initial positions after they have left the wire rows 213. With this arrangement, the measuring accuracy is expected to improve.

Furthermore, in this embodiment, voltage is applied to the wires 209, however, voltage may be applied to the contact shoes 216 and 216 and the wires 209 may be grounded.

Figure 11:
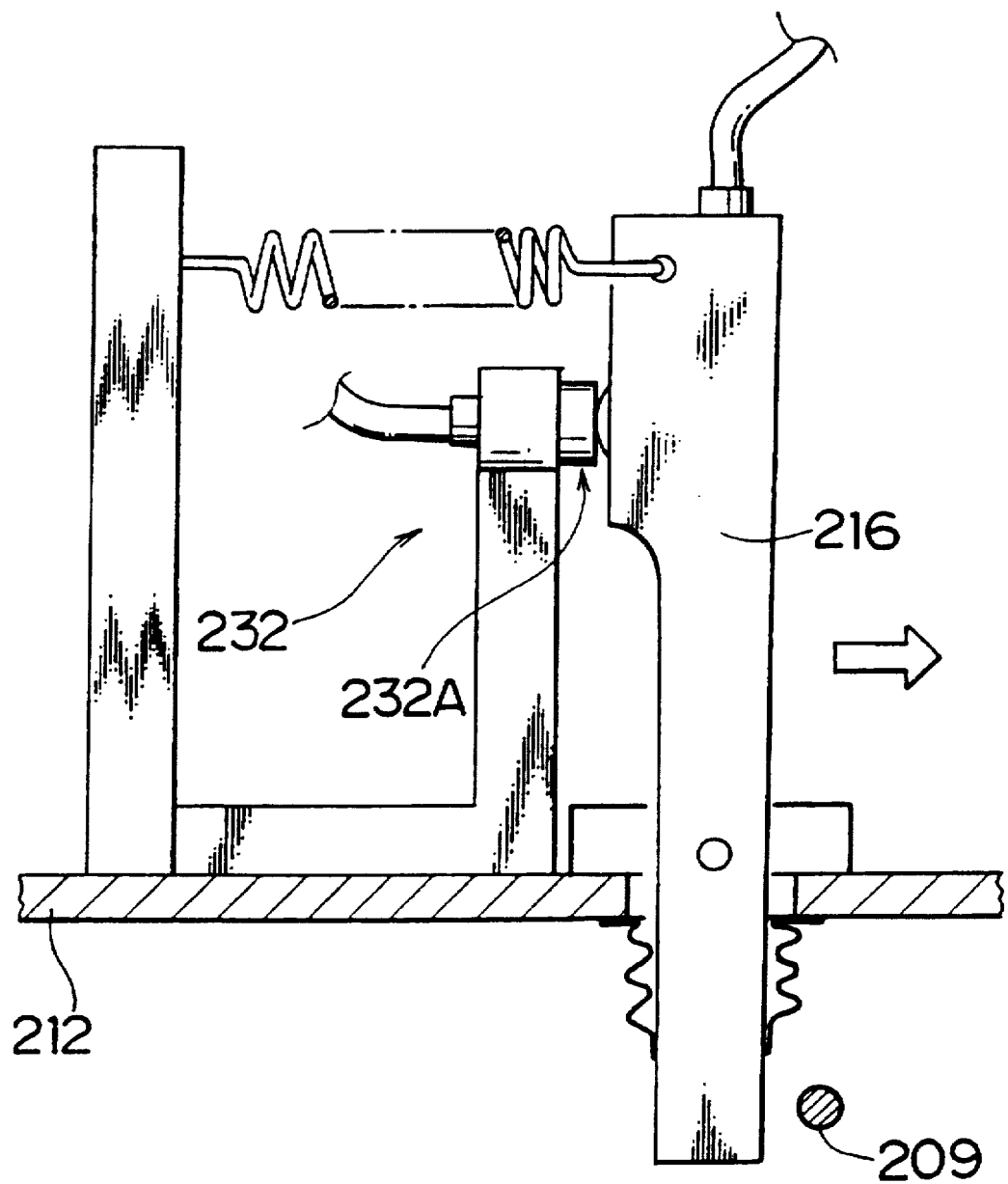

Furthermore, in order to sense that the contact shoe 216 is brought into contact with the wire rows 213, the detection circuit 225 is formed, however, the contact sensing means should not necessarily be limited to this, and a limit switch 232 shown in FIG. 11 may be used for example. That is, a contact point 232A is adapted to come off when the contact shoe 216 comes into contact with the wire rows 213, and this information may be outputted to the control section 218. Furthermore, as other contact sensing means, laser, a photoelectric sensor and a photomicrograph may be used.

Furthermore, the work piece holder 212 has been rocked by the driving motor 214 to bring the contact shoes 216 and 216 into contact with the wires 209, however, the contact shoes 216 and 216 may be respectively provided with moving mechanisms, and only the contact shoes 216 and 216 may be moved to come into contact with the wires 209.

As has been described above, according to the invention described in claim 1, by means of the simple member and jigs such as the work piece bonding block, the bonding jig and the mounting jig, the central axis of the work piece made of the single crystal material can be easily and quickly set so as to perpendicularly intersect the cutting plane, and the work piece can be inclined against the cutting plane so that the central axis is inclined at the predetermined angle against the cutting plane on the basis of the shift value information of the crystal orientation with the central axis a reference, which has been previously measured, whereby the system is inexpensive and the crystal orientation matching of the work piece can be performed easily and quickly compared with the conventional method and the working efficiency can be improved.

Furthermore, according to the invention disclosed in claim 7, even if there is a mistake in stretching the wire rows, the mistake is sensed and the work piece can be automatically repositioned to the correct position so as to be cut at the predetermined reference angle. As a result, the adverse influence of the mistake in stretching the wires can be eliminated.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of positioning a rod-shaped work piece made of a single crystal material to be cut into wafers by a wire saw, comprising the steps of:

positioning and bonding said work piece to a work piece bonding block at a first spaced location not operatively related to said wire saw, said work piece having at least one of an orientation flat and a notch, so that the central axis of said work piece is parallel to respective horizontal and vertical reference surfaces of said work piece bonding block in a state where the at least one of the orientation flat and the notch is located at a predetermined position;

measuring shift value information of a crystal orientation of said work piece at a second spaced location not operatively related to said wire saw;

positioning and mounting said work piece bonding block at a mounting jig of said wire saw, said mounting jig having horizontal and vertical reference surfaces that match with the respective horizontal and vertical reference surfaces of said bonding block, so that and the central axis of said work piece is parallel to a wire plane formed by a row of tensioned wires of said wire saw, and said central axis of said work piece is perpendicular to each individual wire of said wire saw;

confirming that said horizontal and vertical reference surfaces of said work piece bonding block have been respectively mounted on said horizontal and vertical reference surfaces of said mounting jig with a mounting jig mounting confirmation sensor; and adjusting an orientation of the work piece by rocking said work piece bonding block in first and second planes, the first plane being parallel to the plane of the horizontal reference surface of the mounting jig and in a plane parallel to the plane of the vertical reference surface of the mounting jig on the basis of the measured shift value information of the crystal orientation of said work piece;

cutting said work piece so that a cut surface of the work piece can be in a predetermined crystal orientation.

2. A system for positioning a rod-shaped work piece made of a single crystal material to be cut into wafers by a wire saw, comprising:

means for positioning and bonding said work piece to a work piece bonding block at a first spaced location not operatively related to said wire saw, said work piece having at least one of an orientation flat and a notch, so that the central axis of said work piece is parallel to respective horizontal and vertical reference surfaces of said work piece bonding block in a state where the at least one of the orientation flat and the notch is located at a predetermined position;

means for measuring shift value information of a crystal orientation of said work piece at a second spaced location not operatively related to said wire saw;

means for cutting said work piece comprising a row of tensioned wires;

means for positioning and mounting said work piece bonding block at a mounting jig of said wire saw, said mounting jig having horizontal and vertical reference surfaces that match with the respective horizontal and vertical reference surfaces of said bonding block, so that and the central axis of said work piece is parallel to a wire plane formed by said row of tensioned wires, and said central axis of said work piece is perpendicular to each individual wire of said wire saw;

means for confirming that said horizontal and vertical reference surfaces of said work piece bonding block have been respectively mounted on said horizontal and vertical reference surfaces of said mounting jig with a mounting jig mounting confirmation sensor; and means for adjusting an orientation of the work piece by rocking said work piece bonding block in first and second planes, the first plane being a plane parallel to the plane of the horizontal reference surface of the mounting jig and in a plane parallel to the plane of the vertical reference surface of the mounting jig on the basis of the measured shift value information of the crystal orientation of said work piece so that a cut surface of the work piece can be in a predetermined crystal orientation.

* * * * *